United States Patent [19]
Maeno et al.

[11] Patent Number: 5,812,290
[45] Date of Patent: Sep. 22, 1998

[54] OPTICAL SWITCHING UNIT AND CONTROL METHOD FOR SAME

[75] Inventors: Yoshiharu Maeno; Yoshihiko Suemura; Naoya Henmi, all of Tokyo, Japan

[73] Assignee: NEC Corporation, Tokyo, Japan

[21] Appl. No.: 764,484

[22] Filed: Dec. 12, 1996

[30] Foreign Application Priority Data

Dec. 15, 1995 [JP] Japan ................................. 7-347683

[51] Int. Cl.⁶ ........................ H04B 10/12; H04B 10/24
[52] U.S. Cl. ..................... 359/117; 359/127; 359/128; 359/139; 359/143; 359/177; 370/278; 370/250; 370/247
[58] Field of Search ................................ 359/139, 156, 359/161, 179, 187, 312; 364/229, 240, 258; 372/29; 179/18, 6; 370/60, 110; 385/17, 16, 44, 45; 379/377, 386, 3; 395/280, 281, 287

[56] References Cited

U.S. PATENT DOCUMENTS

| | | | |
|---|---|---|---|
| 4,156,799 | 5/1979 | Cave | 179/18 B |
| 5,303,236 | 4/1994 | Kunimoto | 370/60.1 |
| 5,517,494 | 5/1996 | Green | 370/60 |
| 5,568,479 | 10/1996 | Watanabe et al. | 370/60 |

OTHER PUBLICATIONS

Fiber Channel Physical and Signaling Interface (FC–PH) in ANSI X3 T11, Rev.4.3, 1994, pp. 19–20, Jun. 1, 1994.

*Primary Examiner*—Wellington Chin
*Assistant Examiner*—William H. Fountaine
*Attorney, Agent, or Firm*—Scully, Scott, Murphy & Presser

[57] ABSTRACT

The present invention provides means by which a switch controller that manages lines directly notifies receivers of ineffectiveness of received data upon line disconnection instead of any transmitter indirectly notifying receivers; and according to the invention, an optical transmitter is provided within the optical switching unit, and a switch controller controls the optical transmitter within the optical switching unit and an optical switch having at its input ports one or more dummy ports capable of multicast-transmission. According to this control, upon line disconnection, receivers are connected to the optical transmitter within the optical switching unit that transmits control code in real time, thereby preventing receivers from receiving ineffective data and obviating superfluous signal lines and communication processes between the switch controller and transmitters.

3 Claims, 2 Drawing Sheets

OPTICAL SWITCHING UNIT AND CONTROL METHOD FOR SAME

BACKGROUND OF THE INVENTION

1. Field of the Invention

The present invention relates to an optical switching control method, and particularly to an ideal optical switching unit and control method for establishing connections between processors in a multiprocessor system.

2. Description of the Related Art

In the interest of raising network throughput, optical interconnection technology in which data are transmitted as optical signals using optical fibers is now being introduced in multiprocessor systems in which a plurality of processors are interconnected by way of a high-speed coupling network, operate in concert, and perform coordinated processing as a unit.

Many studies and proposals have been advanced with respect to optical interconnection regarding not only link connection between two nodes but also networks in which a plurality of links are connected by way of switches. This type of technology is described in, for example, "Fiber Channel Physical and Signaling Interface (FC-PH)" in ANSI X3 T11, REV 4.3, 1994, pp. 19–20.

However, signals require an extremely long time to traverse switches if photoelectric conversion, routing processing by electrical circuits, and electrooptical conversion is executed in the switches. As a result, current research is investigating the possibility for realizing optical switching networks for circuit switching systems in which optical switches are used as switches, thereby eliminating the need for photoelectric conversion.

When a line is connected with this type of optical switching, optical signals pass through optical switches from a transmitter to a receiver without undergoing electrical signal processing.

FIG. 1 shows one example of the construction of a prior-art optical switching network which employs as an optical switch a 4×4 optical crossbar switch.

In FIG. 1, 300 indicates an optical switching unit, 310 indicates a 4×4 optical crossbar switch, 311 indicates a switch controller, 320–323 indicate optical transmitters, and 330–333 indicate optical receivers.

Transmission data from optical transmitters 320–323 are transmitted to exchange-connected optical receivers 330–333 by way of 4×4 optical crossbar switch 310. Referring to FIG. 1, optical transmitters 320 and 322 are connected to optical receivers 332 and 333 by way of 4×4 optical crossbar switch 310. The optical transmitters transmit signals modulated by an intensity modulation method to the optical receivers.

When N optical transmitters and optical receivers are connected to the input/output ports of the above-described N×N optical switch, an optical receiver not connected to a line (an optical receiver not connected to an optical transmitter by way of an optical switch) is not connected to any optical transmitter and constantly receives signals from the optical switch that are optically proportionate to the low level of intensity-modulated signals.

These low-level signals are logically ineffective signals, but as the receiver is not provided with a means of judging effectiveness of signals, the ineffective signals are also erroneously judged to be effective. In FIG. 1, the low-level signals received by optical receivers 330 and 331, which are not connected to lines, are processed as effective signals.

In optical receivers not connected to any optical transmitter, the problem arises that the bit synchronism for determining the clock cycle and phase of received signals and byte synchronism for determining the byte phase of received signals cannot be obtained.

Thus, in an optical switching network in which only optical transmitters and optical receivers are connected to optical switches, N optical receivers must all be connected to some optical transmitter.

An optical receiver not connected to a line must be connected to a transmitter that is similarly not connected to a line. Such optical transmitters must in turn repeatedly send data such as a control code predetermined on the network that enables judgment of ineffectiveness. Moreover, each time the connection state of a line is altered, switch controller 311 must assign an optical transmitter to transmit the control code to all optical receivers not connected to a line, and must direct the transmission of the control code to the optical transmitters.

In other words, as shown in FIG. 2, optical receivers 330 and 331, which are not connected to a line, must be connected to each of optical transmitters 321 and 323, which similarly are not connected to a line, and optical transmitters 321 and 323 must transmit the control codes to optical receivers 330 and 331 in accordance with the directions of switch controller 311.

Considerable difficulties are encountered in carrying out this type of process in real time without providing a time slot for optical receivers to receive the ineffective data.

Moreover, such a process entails extra signal lines and communication processes between the switch controller and optical transmitters.

SUMMARY OF THE INVENTION

The present invention therefore was developed in view of the above-described problems of the prior art and has the object of providing an optical switching unit and control method for the optical switching unit in which a switch controller that manages lines directly notifies receivers of the ineffectiveness of received data when a line is disconnected, rather than any transmitter indirectly notifying receivers.

To achieve the above-described object, the present invention proposes an optical switching unit that includes: an optical transmitter established within an optical switching unit;

an optical switch having as input ports one or a plurality of dummy ports capable of multicast transmission that simultaneously transmit from one site connected to the optical transmitter to a plurality of sites; and switch controlling means that controls transmission of the optical transmitter and switching of the optical switch.

In the optical switching unit of the present invention, the switch controlling means controls switching of the optical switch such that an output port of the optical switch and/or optical receiver not connected to a line connects to the optical transmitter within the optical switching unit by way of the dummy port; and controls transmission such that a prescribed control code is multicast-transmitted from the optical transmitter disposed within the optical switching unit to one or a plurality of the optical receivers not connected to lines.

Further, the present invention proposes an optical switching control method for an optical switching unit having an optical transmitter established within an optical switching unit; an optical switch having as input ports one or a plurality of dummy ports capable of multicast transmission that simultaneously transmit from one site connected to the optical transmitter to a plurality of sites; and a switch controlling means that controls transmission of the optical transmitter and switching of the optical switch; and including:

a step for connecting an optical receiver or output port of the optical switch not connected to a line to a dummy port and the optical transmitter within the optical switching unit; and a step for transmitting a prescribed control code from the optical transmitter within the optical switching unit to one or a plurality of optical receivers not connected to a line and notifying completion of message transmission and line disconnection.

The present invention proposes means by which a switch controller that manages lines notifies receivers directly rather than a means by which one of the transmitters is directed by a switch controller to indirectly notify receivers of the ineffectiveness of received data.

According to the present invention, the reception of ineffective data by optical receivers can be prevented by providing an optical transmitter within the optical switching unit and having a switch controller directly control this optical transmitter based on the above-described construction. When disconnecting the main line, optical receivers can be connected to the optical transmitter within the optical switching unit in real time. Finally, the present invention obviates extra signal lines for communication processing and extra communication processing between the switch controller and optical transmitter.

The above and other objects, features, and advantages of the present invention will become apparent from the following description based on the accompanying drawings which illustrate an example of a preferred embodiment of the present invention.

DETAILED DESCRIPTION OF THE PREFERRED EMBODIMENT

An embodiment of the present invention will next be explained with reference to the figures.

Figure 1:
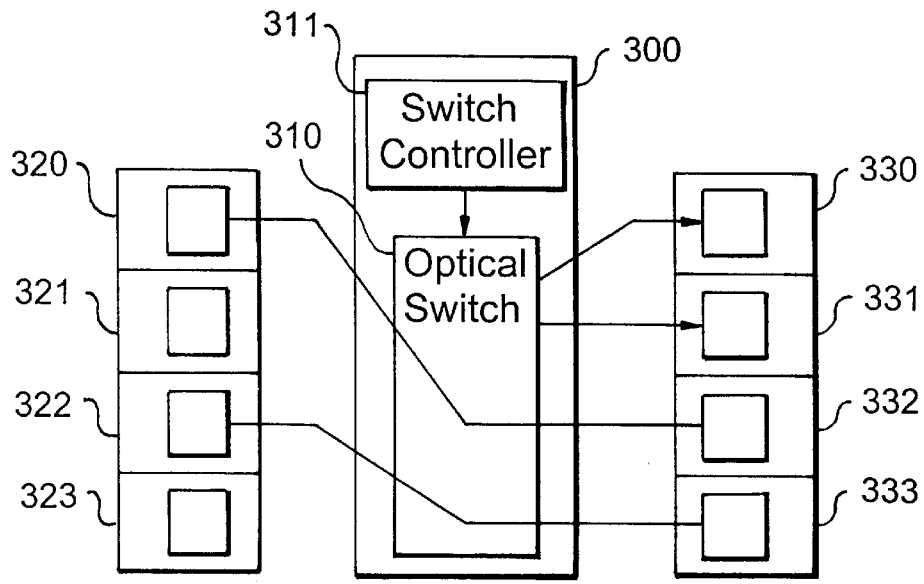
FIG. 1 illustrates the construction of an optical switching unit of the prior art, and illustrates the connection state of optical receivers that are not connected to lines and optical receivers that are connected to lines.
Figure 2:
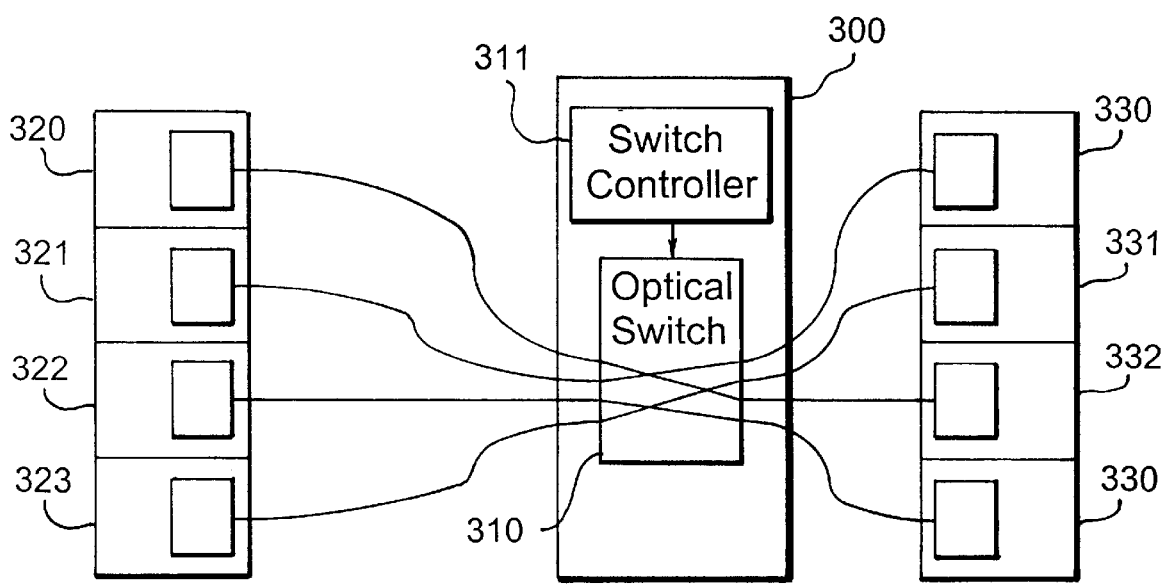
FIG. 2 shows a state in which a prescribed control code is transmitted from optical transmitters that are not connected to lines to optical receivers that are not connected to lines.
Figure 3:
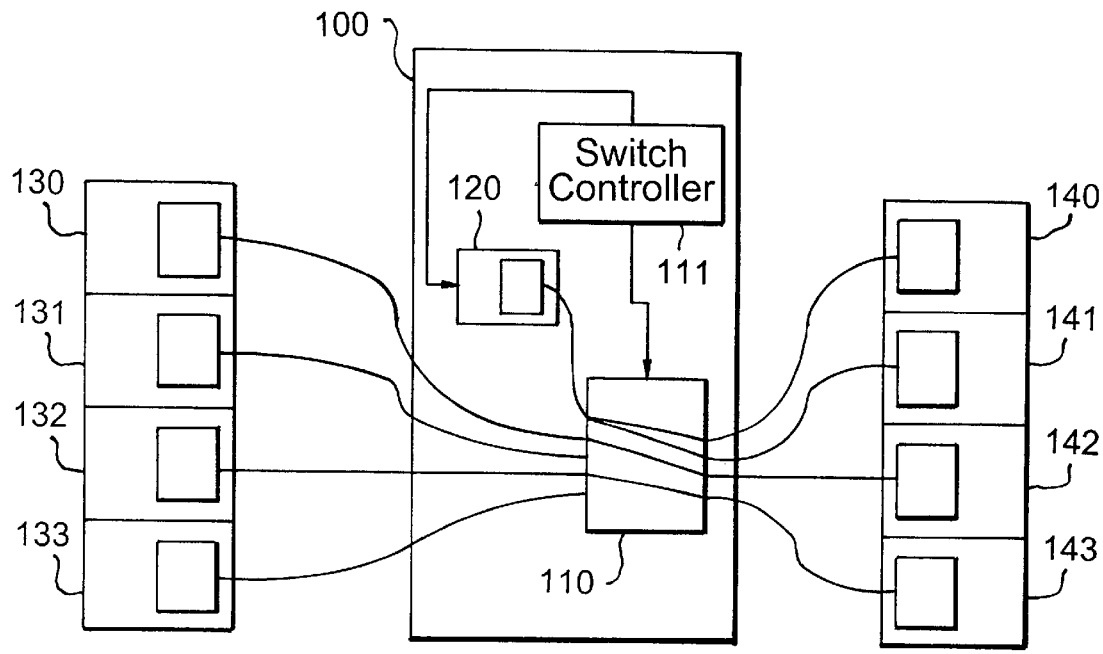
FIG. 3 shows the construction of an optical switching unit according to one embodiment of the present invention.

FIG. 3 shows the construction of an embodiment of the present invention in which the optical switching unit has four inputs and four outputs and employs as an optical switch an optical crossbar switch provided with input ports capable of multicast transmission.

In FIG. 3, 100 indicates an optical switching unit, 110 indicates a 5×4 optical crossbar switch, 111 indicates a switch controller, 120 indicates an optical transmitter within the optical switching unit (hereinafter referred to as "transmitter within the optical switching unit"), 130–133 indicate optical transmitters, and 140–143 indicate optical receivers. One input port of 5×4 optical crossbar switch 110 is a dummy port capable of multicast, and as will be described hereinbelow, is connected as an input port of transmitter 120 within the optical switching unit under the control of switch controller 111.

Transmission data on the network are all encoded according to 8B10B code (ANSI X3T11 FCPH, encoding 8-bit data to 10-bit code). Optical transmitters 130–133 and transmitter 120 within the optical switching unit are all provided with 8B10B coders (encoders), and optical receivers 140–143 are all provided with 10B8B decoders (which decode 10-bit code to 8-bit data).

In 8B10B code, several control codes are established apart from data code. Transmitter 120 within the optical switching unit transmits K28.5 (bit pattern "0011111010"), which is one control code under the control of switch controller 111.

FIG. 3 shows a state in which optical receivers 142 and 143 are connected to optical transmitters 130 and 132, respectively, and optical receivers 140 and 141, which are not connected to lines, are connected to transmitter 120 within the optical switching unit.

Transmitter 120 within the optical switching unit performs multicast-transmission of control code K28.5 to optical receivers 140 and 141 under the direction of switch controller 111.

Optical receivers 140 and 141 identify the received K28.5 as control code and recognize completion of message transmission and line disconnection. At the time of line disconnection, bit synchronization and byte synchronization can be secured from the received K28.5.

Figure 4:
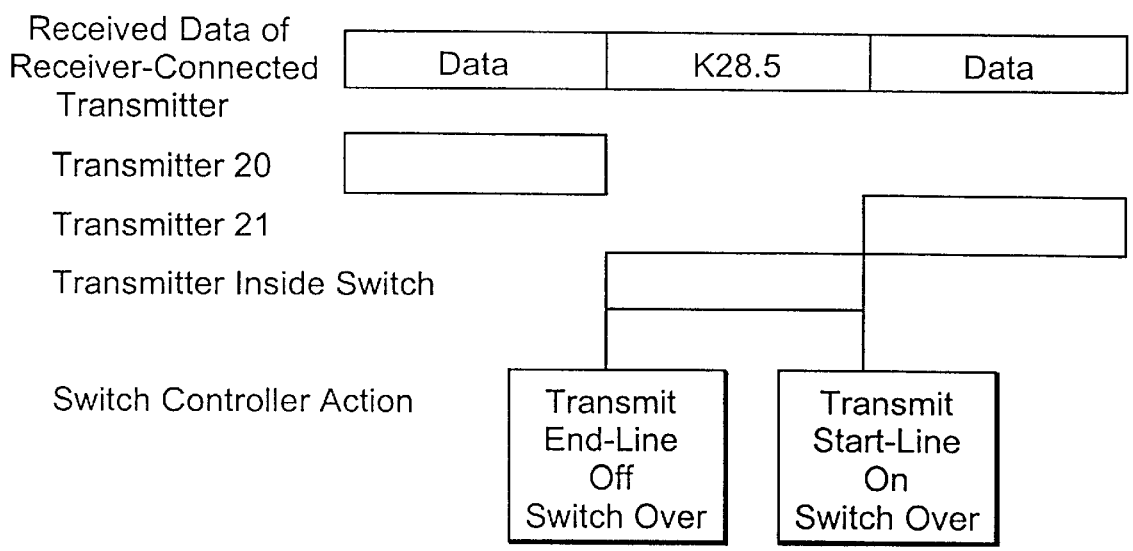
FIG. 4 illustrates the line disconnection and reconnection processing operations in an optical switching unit of one embodiment of the present invention.

FIG. 4 is a timing chart illustrating the operation of switch controller 111 upon line disconnection and reconnection.

When the line is disconnected, switch controller 111 both controls 5×4 optical crossbar switch 110 such that the connection partner of the optical receiver is switched to transmitter 120 within the optical switching unit and simultaneously directs transmitter 120 within the optical switching unit to transmit control code K28.5.

When the line is again connected, switch controller 111 controls 5×4 optical crossbar switch 110 such that the connection partner of the optical receiver is switched from transmitter 120 within the optical switching unit to the transmitter of the connection partner.

As a modification of the embodiment of the present invention, a control code other than K28.5 in 8B10B code may be used, and another code may also be used other than 8B10B code in which the control code is determined.

The optical switching unit of the present invention is not limited to the crossbar switch construction of the above-described embodiment. In greater detail, as a modification of the embodiment of the present invention, the optical switching unit may be constructed using an optical switch of multi-stage construction that is constructed from: an optical switch capable of multicast transmission of other than crossbar construction such as a splitter/combiner switch that is capable of selective switching of optical signal paths between a plurality of input ports and a plurality of output ports, and a switch for performing routing processing of optical signals; and a second switch (a selective switch of optical signal source to output ports) for performing switching processing between output signals from the routing switch and signals from the transmitter within the optical switching unit.

The present invention according to the foregoing description provides the effects of eliminating assignment of transmitters upon line disconnection, connection processing, and excessive communication processing between a switch controller and transmitters; thereby allowing simplified control and real-time processing.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. An optical switching unit comprising:

an optical transmitter arranged within an optical switching unit;

an optical switch having message input ports for receiving message transmissions and at least one input dummy ports, said input dummy port being capable of multicast transmission that simultaneously transmits from said input dummy port connected to said optical transmitter to a plurality of output ports; and switch controlling means that controls transmission of said optical transmitter and switching of said optical switch, such that when at least one of said output ports is disconnected from said message input port the switch controller connects said disconnected output port to said input dummy port in real time wherein said transmitter directly provides a prescribed control code to said disconnected output port for notification of completion of message transmission and said disconnection.

2. An optical switching unit according to claim 1 wherein said switch controlling means further comprises:

transmission control means that controls transmission such that said prescribed control code is multicast-transmitted from said optical transmitter disposed within said optical switching unit to one or a plurality of disconnected outputs.

3. An optical switching control method for an optical switching unit, said optical switching unit comprising:

an optical transmitter disposed within an optical switching unit;

an optical switch having message input ports for receiving message transmissions and at least one input dummy ports, said input dummy port being capable of multicast transmission that simultaneously transmits from said input dummy port connected to said optical transmitter to a plurality of output ports; and switch controlling means that controls transmission of said optical transmitter and switching of said optical switch;

said optical switching control method comprising:

a step for connecting one or more disconnected output ports of said optical switch in real time to said input dummy port and said optical transmitter within said optical switching unit;

a step for transmitting a prescribed control code from said optical transmitter within said optical switching unit directly to said one or more disconnected outputs; and a step for notifying completion of message transmission and line disconnection.

\* \* \* \* \*